T. James,
Brick Mold.
N° 54,734. Patented May 15, 1866.
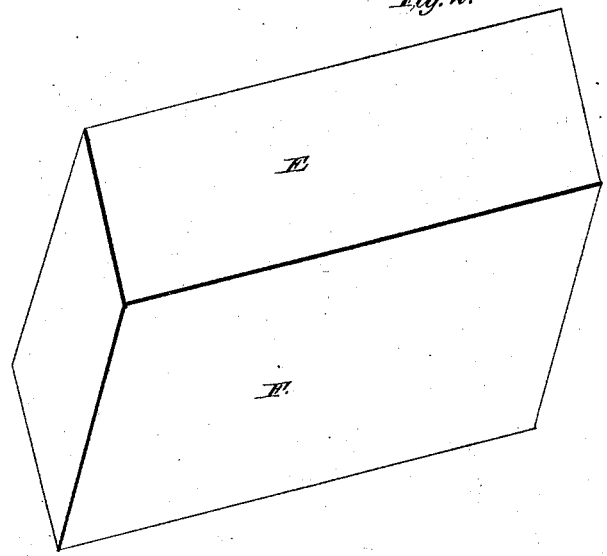
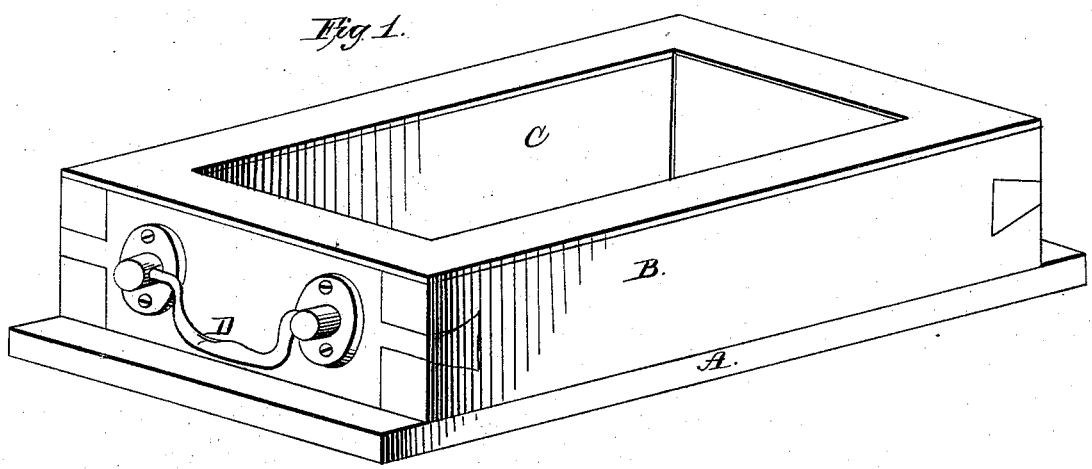
Witnesses:
Chas A. Pettit
Guy C. Humphries
Inventor:
Thomas James.
By Munn & Co
Attorneys

UNITED STATES PATENT OFFICE.

THOMAS JAMES, OF BALTIMORE, MARYLAND, ASSIGNOR TO HIMSELF AND PRUDENCIO DE MURGUIONDO, OF SAME PLACE.

IMPROVED BRICK-MOLD.

Specification forming part of Letters Patent No. 54,734, dated May 15, 1866.

*To all whom it may concern:*

Be it known that I, THOMAS JAMES, of the city and county of Baltimore and State of Maryland, have made new and useful Improvements in Brick-Molds; and I do hereby declare the following to be a full, clear, and exact description of the nature, construction, and operation of the same, sufficient to enable one skilled in the art to which it appertains to construct and use the same, reference being had to the accompanying drawing, which is made part of this specification, and in which my improvement is represented in a perspective view.

The invention consists in lining the mold and piston with a surface of glass, or in making them of solid glass or blocks of glass or vitreous material suitably clamped together.

In the drawing, A is the pallet-board; B, the mold; C, the lining-surface of glass; D, the handle; E, the piston or plunger, and F the glass lining or facing of the said piston.

It has been a practice to make the molds of cast-iron or brass as a substitute for wood, owing to the rapid wear of the latter. The mold has also been brass-lined, with the same intention; but the metallic edges rapidly wear off, and the repair of said molds is expensive.

I have found that glass presents a surface to which the most plastic clay does not adhere, and that the bricks formed in a mold of this character are equal to those ordinarily molded and afterward subjected to pressure. In addition to the improved surface the molder can readily make a larger number in my improved mold than in the ordinary wooden mold.

The pallet-board may be of glass, slate, metal, or of wood, as convenience and judgment may determine.

The glass facing or lining is equally applicable to the molds of brick-machines or to hand brick-molds, and I also design to apply it to the faces of the plungers or pistons of brick-pressing machines.

The surfaces of tile or other clay molding machines which are exposed to the contact of the clay or of the brick may be faced with glass with great advantage.

I might go on at length to describe various forms and sizes of molds varying in character with the kind and quality of article produced.

Having described my invention, what I claim therein as new, and desire to secure by Letters Patent, is—

A mold for forming bricks or other articles of clay made wholly or in part of vitreous material, or faced or lined with vitreous material, for the purposes set forth.

THOMAS JAMES.

Witnesses:
T. R. RICH,
WM. N. BRICE.